INVENTOR.
ARNOLD ROBERT REIN
BY
ATTORNEY

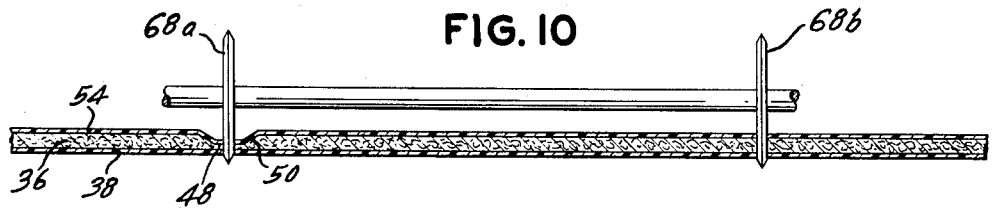
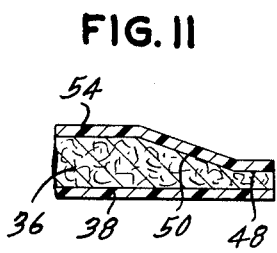
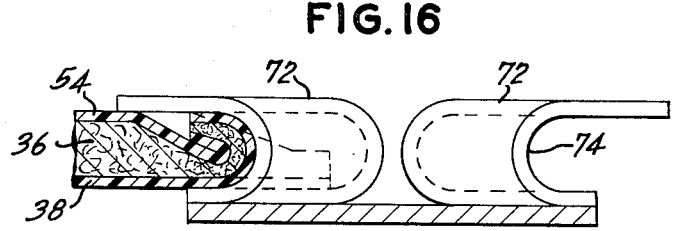
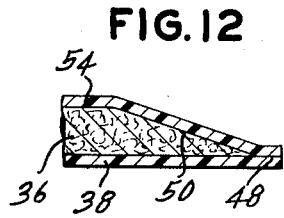
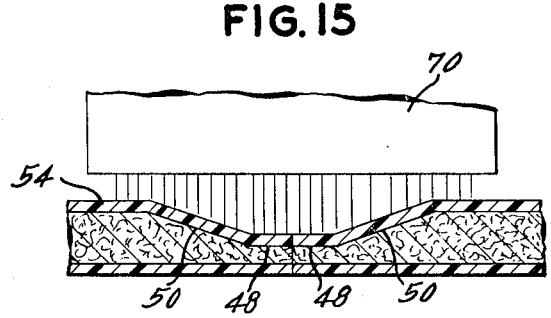
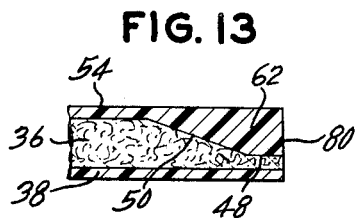
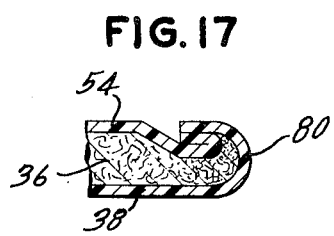
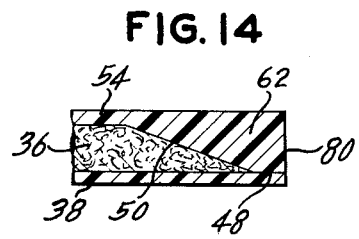

March 11, 1969 A. R. REIN 3,432,375
METHOD OF RAW EDGE PROTECTION
Filed May 13, 1964 Sheet 4 of 4

INVENTOR.
ARNOLD ROBERT REIN
BY
Donald A. Kaul
ATTORNEY

United States Patent Office 3,432,375
Patented Mar. 11, 1969

3,432,375
METHOD OF RAW EDGE PROTECTION
Arnold Robert Rein, Menasha, Wis., assignor to American Can Company, New York, N.Y., a corporation of New Jersey
Filed May 13, 1964, Ser. No. 367,087
U.S. Cl. 156—202                                15 Claims
Int. Cl. B31f *1/00;* B29c *24/00*

ABSTRACT OF THE DISCLOSURE

A method for making body blanks for a fibre container wherein the edges in the finished container will be protected against wicking. The blanks are made by cutting grooves in the top of a web of fibre material which has a protective layer on the bottom and then coating the upper surface with a thermoplastic film and cutting the web along the bottom of the grooves.

---

This invention relates to a method of raw edge protection and more particularly it relates to a method of protecting a raw edge for a fibre container to prevent wicking from occurring at that edge.

Liquid-tight fibre containers have been widely used for a number of years for packaging products such as milk, fruit juices, non-carbonated beverages, and other similar liquids. These containers are generally of a tubular configuration such as is illustrated in U.S. Patent No. 2,085,979 issued to John E. Hothersall wherein a pouring opening is formed in the top and a hinged plug is used to close the opening.

Until recently such fibre containers were exteriorly coated with wax to provide an outer moisture barrier, but the use of such wax coatings over the fibre layer was not entirely satisfactory in that they tended to flake off, to impregnate the fibre and create a mottled appearance, and in general to present an unattractive appearance to the consumer. Consequently, manufactures are now directing their efforts away from waxed fibre containers and toward containers having plastic coatings laminated onto the fibre layers.

While such new plastic coated containers present a more attractive appearance and have the satisfactory moisture-barrier properties, they are nonetheless subject to the problem of "wicking" at the end seams. This "wicking" or migration of liquid into the raw fibre layers occurs predominantly at the top and the bottom of the container because such containers are constructed by folding the body walls over the outside of the end closure members, thus leaving the end edges of the body walls exposed. This problem was not prevalent in waxed fibre containers since the outer wax coating was applied by dipping the container into a molten wax bath with the result that the wax layer not only covered the container body walls and end closure, but also flowed around and over the raw end edges of the body walls thus protecting them from wicking. However, in plastic coated containers, there is no wax layer to protect the end edges of the body walls, and the plastic coating layers, as conventionally applied, do not extend over these end edges.

The result is that plastic coated containers are formed in such a manner that the raw fibre end edges of the body walls are exposed. Thus, if the container is placed in liquid, on ice, or generally subjected to any exterior moisture, wicking occurs through the exposed fibre edges and the liquid or moisture soaked up by the fibre layer tends to discolor and/or weaken it. The problem is particularly acute at the exposed edges on the top of the container because the liquid contents poured out through the pour hole often tend to run over such exposed during pouring or to accumulate in small puddles on the outside of the container top after pouring, and in either or both of these instances, the liquid container contents will soak or wick into the exposed raw fibre end edges.

An object, therefore, of the present invention is to protect raw edges on fibre containers.

Another object of the present invention is to provide a method for protecting raw fibre edges.

Another object of this invention is to protect fibre containers from wicking which occurs along the end seams where the body wall edges extend over the end members.

Another object of this invention is to provide a method for preventing wicking along the end seams of fibre containers at the areas where the body wall edges extend over the end members.

Another object of this invention is to provide a method for protecting at least one raw edge of a fibre container body blank and to provide such a method in conjunction with the body blank manufacturing operation so that it can be accomplished easily and with little additional cost.

Another object of this invention is to provide an improved method for manufacturing fibre container body blanks.

Numerous other objects and advantages of the invention will be apparent as it is better understood from the following description, which, taken in connection with the accompanying drawings, discloses a preferred embodiment thereof.

The foregoing objects are accomplished by providing a body blank manufacturing sequence wherein a fibre web, coated with plastic or other protective material on its underside, is fed past a set of skiving cutters which form shaped grooves of preselected depth in the fibre. As the feeding continues, an upper thermoplastic coating is extrusion laminated onto the upper side of the fibre web, thus overlying the skived grooves and protecting the fibre along such grooves with a preselected depth of thermoplastic. Subsequently, the web is severed longitudinally down the center of the now-coated, skived grooves and thus each side of the groove presents a protected edge. Then, the web is severed transversely and formed into individual body blanks, each having a protected edge which, when the container is finally assembled, will form its top body wall edge.

Referring to the drawings:

FIG. 10 is a sectional view taken substantially along line 10—10 of FIG. 1 and illustrating the cutter means for severing the web along the skived grooves;

FIGS. 11, 12, 13 and 14 are sectional views of the severed skived grooves illustrated respectively in FIGS. 4, 5, 6 and 7;

FIG. 15 is a sectional view taken substantially along line 15—15 of FIG. 1 and illustrating the heating means;

FIG. 16 is a sectional view taken substantially along line 16—16 of FIG. 1 and illustrating the hemming dies folding back a skived groove section as shown in FIG. 11;

FIG. 17 is a sectional view illustrating the manner in which the skived groove section of FIG. 12 is hemmed;

Figure 1:
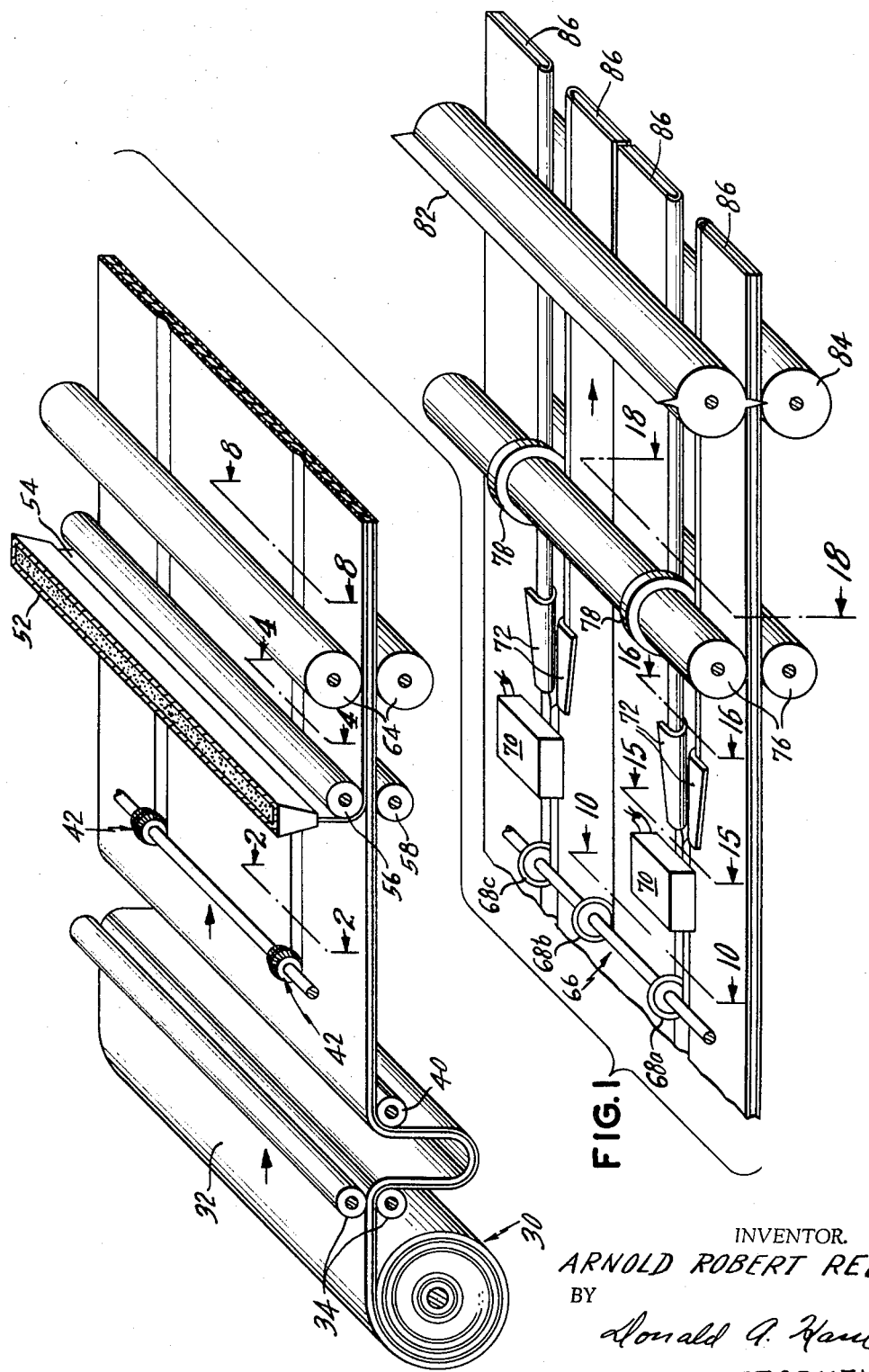
FIGURE 1 is a continuous schematic perspective view illustrating means for carrying out the process of the present invention.

As a preferred or exemplary form of apparatus for carrying out the novel sequence of operations of the present inventive process, there is illustrated in FIG. 1 a roll or pay-off coil 30 which feeds a generally planar web 32 between a pair of feed rollers 34. As can best be seen from FIGS. 2 and 3, the web 32 is formed of a main fibre layer 36 having a protective layer 38, such as thermoplastic, adhered to its underside or lower surface. After the web is fed through the feed rollers, it descends downward in a free loop, then rises over an idler roll 40 and passes beneath a pair of spaced skiving cutters generally designated 42.

Figure 2:
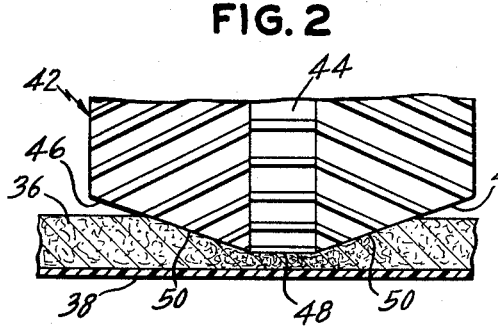
FIGURE 2 is a sectional view taken substantially along line 2—2 of FIG. 1 and illustrating a skived groove being formed partially through the fibre web.
Figure 3:
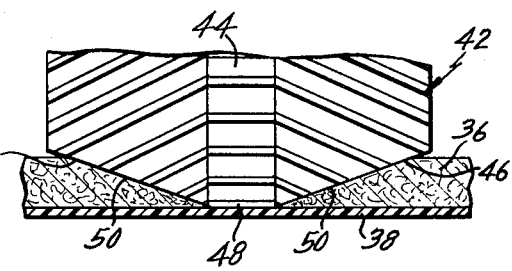
FIGURE 3 is a sectional view similar to FIG. 2 and illustrating a skived groove being formed completely through the fibre web.

As can best be seen from FIGS. 2 and 3, each individual skiving cutter 42 has a flat center section 44 and a pair of beveled side sections 46 tapering away from the center section. The skiving cutters 42 are supported above the web 32 and rapidly rotated by suitable means to produce a skived groove within the fibre layer 36. The groove produce is in the form of an isosceles trapezoid having a flat bottom 48 and tapered sides 50. The skiving cutters 42 are adjustably mounted to permit the grooves to be skived to a preselected depth. In FIG. 2, the groove is skived only partially through the fibre 36 and the groove bottom 48 is formed of fibre. In FIG. 3, the groove is skived completely through the fiber 36 and the groove bottom 48 is formed of thermoplastic of the lower layer 38.

After the web 32 has had the spaced grooves skived therein, it feeds beneath an extruder head or die 52 which is disposed above the web and extending transversely the full width thereof. The extruder 52 extrudes a thin film 54 of thermoplastic downwardly into contact with the upper surface of the web 32, and thereafter the web 32 and film 54 pass through the nip of a chill roll 56 and a backup roll 58 which coact to firmly press the film 54 onto the web whereon it solidifies.

Figure 4:
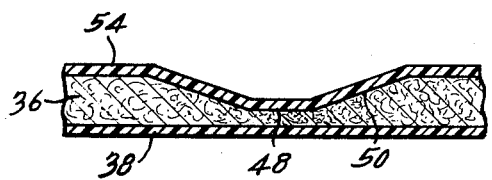
FIG. 4 is a sectional view taken substantially along line 4—4 of FIG. 1 and illustrating a thermoplastic coating laminated over the skived groove of FIG. 2.
Figure 5:
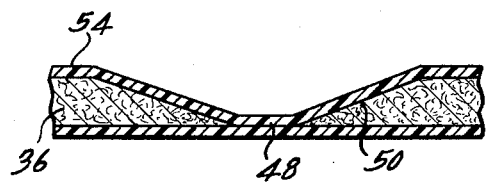
FIG. 5 is a sectional view similar to FIG. 4 and illustrating a thermoplastic coating laminated over the skived groove of FIG. 3.
Figure 8:
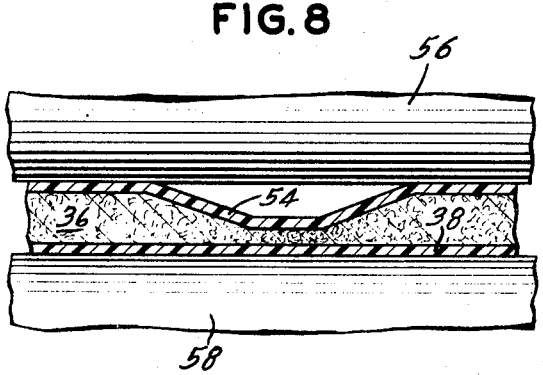
FIG. 8 is a sectional view taken substantially along line 8—8 of FIG. 1 and illustrating one form of chill roller.
Figure 9:
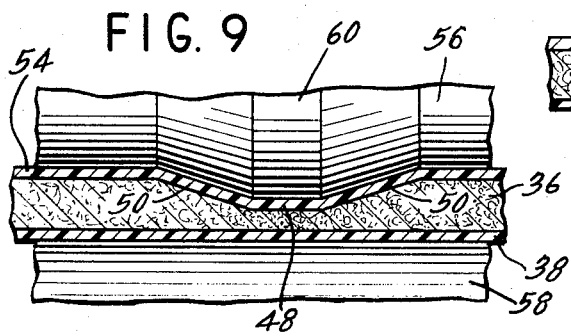
FIG. 9 is a sectional view similar to FIG. 8 and illustrating a modified form of chill roller.

FIGS. 4 and 5 illustrate how the upper film 54 is laminated onto the web 32 and over the skived grooves of FIGS. 2 and 3 respectively. The raw fibres along the walls 48 and 50 of the groove tend to attract and adhere the upper film 54 and consequently it is possible to use a conventional cylindrical chill roll 56 as shown in FIG. 8. However, alternatively, it is possible to use a modified form of chill roll as shown in FIG. 9 wherein an enlarged trapezoidal portion 60 forces the upper film 54 into positive pressurized contact with the walls 48 and 50 of the skived groove. Although the modified chill roll 56 of FIG. 9 is illustrated in connection with a groove scored partially through the fibre layer, as shown in FIG. 2, it should be understood that it operates with equal efficacy with respect to a groove scored completely through the fibre layer as shown in FIG. 3. In this latter situation, the upper film 54 actually bonds to or coheres with the lower film 38.

Figure 6:
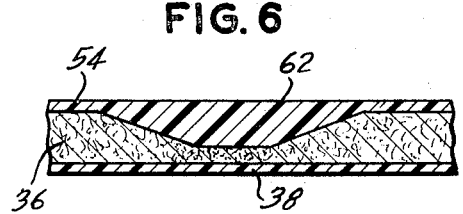
FIG. 6 is a sectional view similar to FIG. 4 and illustrating a modified form of thermoplastic coating laminated over the skived groove of FIG. 2.
Figure 7:
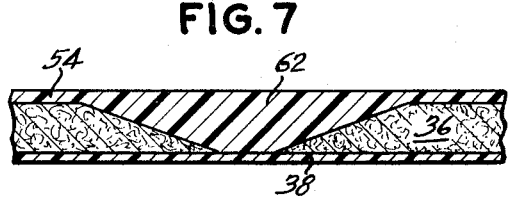
FIG. 7 is a sectional view similar to FIG. 4 and illustrating a modified form of thermoplastic coating laminated over the skived groove of FIG. 3.

In the hereinbefore described extrusion operation, the upper film 54 followed contiguously the shape of the skived grooves, and the thickness of the film 54 which adhered to the walls 48 and 50 of the groove was identical to the thickness of the film which adhered to the upper surface of the web 32. However, it is also possible to completely fill the skived groove with thermoplastic as is shown in FIGS. 6 and 7. In each of these figures, the skived groove is filled with a thermoplastic strip 62 and the upper film is cohered to this strip. The strip 62 can be introduced into the groove in any suitable manner, the preferred method being by means of a differential die opening in the extruder head 52. In such a set-up, the die opening is formed mainly of an elongated slot which forms a thin sheet 54, but over the skived grooves, the die opening is enlarged to permit a thick strip of plastic to flow into the grooves. Another suitable manner of producing the filled grooves shown in FIGS. 6 and 7 is to locate a pair of nozzles over the grooves immediately prior to the extrusion head 52. The nozzles can introduce the molten thermoplastic strips 62 into the grooves and subsequently the extruder 52 can extrude the thin film 54 over the strips 62 and the fibre 36.

A pair of feed rolls 64, located beyond the extruder 52, engage the upper and lower surfaces of the now coated web 32 to feed it along and beneath a severing means generally designated 66. In the form illustrated, the severing means 66 includes three spaced rotary cutter blades 68a, 68b, and 68c, with the center blade 68b serving to divide the web 32 in half, and the outer blades 68a and 68c serving to sever the web centrally of the skived grooves. As can best be seen from FIG. 10, the outer blades 68a and 68c cut through the center of the groove and divide the groove bottom wall 48 in half. After the severing takes place, the resultant cross-sectional configuration at the groove will be one of the four forms shown in FIGS. 11, 12, 13 and 14 which represent respectively the severed or divided grooves of FIGS. 4, 5, 6 and 7.

Figure 18:
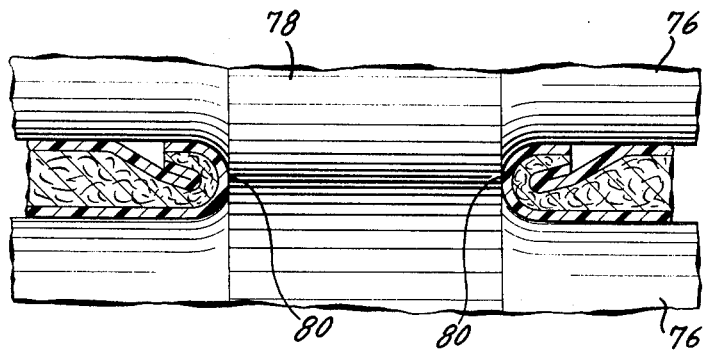
FIG. 18 is a sectional view taken substantially along line 18—18 of FIG. 1 and illustrating the pressure rollers.

When the severed groove is of the form shown in FIG. 11 or 12, the edge presented is substantially protected in that little if any raw fibre 36 is exposed, but the edge is a flimsy feather edge which is difficult to work with in subsequent manufacturing operations. Accordingly, to fully protect the edge against wicking and to give it some thickness and rigidity, the edge of the stock is heated, hemmed and heat sealed as shown generally in FIG. 1 and in greater detail in FIGS. 15–18. After the skived grooves are slit in half by the severing means 66, they are passed beneath a heating means 70 which, by suitable means such as infra-red heat, hot air, or the like, renders the upper film 54 hot, soft, and tacky. The web 32 is then fed through sets of folding shoes or hemming dies 72 which have shaped grooves 74 therein gradually angling away from the center of the skived grooves. When the skived groove halves pass through these hemming dies 72, the shaped grooves 74 cause them to fold back upon themselves with the groove bottom portion 48 becoming adhered to the groove side portion 50 by means of the heated film 54 which acts as a hot melt adhesive. The groove half of FIG. 11 folds back upon itself and is hemmed in a manner as shown in FIG. 16 while the groove half of FIG. 12 folds back upon itself and is hemmed in a manner as shown in FIG. 17. A pair of pressure rolls 76 then contact the upper and lower web surfaces as shown in FIG. 18, to assure a tight adherent contact at the hemmed edge. The rolls 76 have enlarged portions 78 which fit between the adjacent groove halves to assure that they remain properly spaced and to assure that the web edges are properly rounded and contoured. It can thus be seen that the edges are properly protected and that no raw fibre is exposed, and these finished fully protected edges are generally designated 80.

At this point, it should again be reiterated that the steps of heating by the heating means 70, hemming by the hemming shoes 72, and finishing by the pressure rolls 76, are used only in connection with the groove half embodiments of FIGS. 11 and 12, and that these steps are not so much for protecting the raw edge as they are for providing a finished edge with sufficient thickness and rigidity to be utilized in container manufacture. In the groove half embodiments of FIGS. 13 and 14, the finished edge 80 is formed merely by severing the filled groove. It will be seen that the edge 80 of FIG. 14 is completely protected in that no fibre 36 is exposed and also that the edge 80 is of full web thickness and rigidity. The edge 80 of FIG. 13 has a very small amount of fibre 36 exposed but this area of exposed fibre is so thin that no appreciable wicking can occur through it. Just as with FIG. 14, the edge 80 of FIG. 13 is of full web thickness and rigidity. It is thus apparent that with an end structure as shown in FIG. 13 or 14, the heating, hemming and heat sealing steps can be eliminated.

When the finished edge 80 is completed, whether it be the hemmed type as shown in FIGS. 17 and 18 or the nonhemmed type as shown in FIGS. 13 and 14, the web 32 is transversely severed to produce individual container body blanks. To this end, the web 32 passes beneath a rotary cutter with spaced transverse blades 82 affixed thereto. A backup roll 84 is located beneath the rotary cutter and, as the web 32 feeds between the cutter and the backup roll, the blades 82 sever the web into individual container body blanks generally designated 86 and having one protected edge 80.

Figure 19:
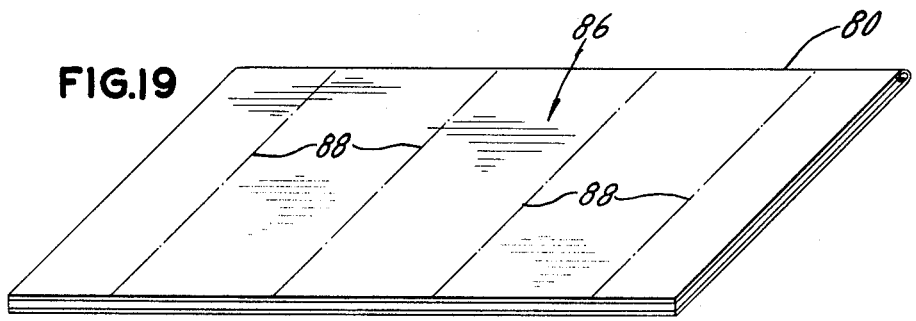
FIG. 19 is a perspective view of an individual body blank severed from the web and provided with fold lines.
Figure 20:
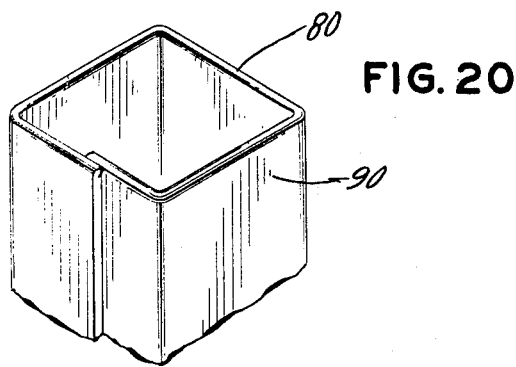
FIG. 20 is a fragmentary perspective view of the body blank of FIG. 19 folded into a tubular container body configuration.

A body blank 86 is illustrated in FIG. 19 and it can be seen that the blank is generally rectangular in shape and is provided with three exposed fibre edges and one protected edge 80 which is to form the top of the container. Appropriately spaced parallel fold or crease lines 88 can be formed in the blank 86 and it can subsequently be folded along these lines to form a tubular container body 90 as shown in FIG. 20 with the top edge of the body being formed by the protected edge 80. This body 90 can subsequently be assembled with end members in the conventional manner illustrated in U.S. Patent No. 2,555,315 issued to Carroll and the finished container will have its upper end seam fully protected against wicking by the protected edge 80.

Although the equipment illustrated in FIG. 1 produces from the web 32, four separate body blanks 86, each with one protected edge 80, it should be understood this is only by way of example anl not limitation. For instance, as the width of the web 32 varies, fewer or more skived grooves can be formed and thus a greater or lesser number of body blanks 86 will be produced. Similarly, if it were desired to protect the bottom edges of the blanks as well as the top ones, this could be accomplished by adding a center skiving cutter aligned with the blade 68b and by adding half skiving cutters at the outer edges of the web. In this manner, and with the addition of the auxiliary illustrated equipment at the appropriate places, which will be apparent to those skilled in the art, the bottom edges of the blanks 86 can also be protected.

It is thought that the invention and many of its attendant advantages will be understood from the foregoing description and it will be apparent that various changes may be made in the steps of the method described and in their order of accomplishment without departing from the spirit and scope of the invention or sacrificing all of its material advantage, the method hereinbefore described being merely a prefered embodiment thereof.

I claim:

1. A method of protecting raw fibre edges comprising the steps of:
   feeding a laminated web having a fibre layer and a non-fibre liquid impervious layer;
   forming at least one groove to a preselected depth in said fibre layer while leaving said on-fibre layer imperforate;
   adhering a thermoplastic layer over said fibre layer and said groove to completely cover said fibre layer; and
   severing said web longitudinally along said groove to divide said web into separate parts with each of said parts having a protected edge formed by one-half of said thermoplastically coated groove.

2. A method as defined in claim 1 wherein said groove is formed with an isosceles trapezoidal cross-sectional shape.

3. A method as defined in claim 1 wherein said groove depth is only partially through said fibre layer.

4. A method as defined in claim 1 wherein said groove depth is completely through said fibre layer.

5. A method for protecting a raw edge of laminated fibre container stock comprising the steps of:
   longitudinally feeding a fiber web having a protective coating adhered to its underside;
   scoring at least one groove longitudinally along said fibre web and to a predetermined depth, said groove being formed with a bottom wall and side walls;
   laminating a thermoplastic film onto said fibre web on the side opposite said protective coating with said film covering both said fibre web and the walls of said groove to form laminated container stock;
   longitudinally severing completely through said laminated container stock along the center of said groove bottom wall;
   heating the side walls and bottom wall portions of said now severed groove to render said thermoplastic film tacky;
   hemming each of said groove halves to cause the bottom wall portion to adhere to its adjacent side wall by means of said tacky film and thereby protecting the fibre edge along each groove half; and
   transversely severing said laminated container stock to form individual container body blanks.

6. A method as defined in claim 5 wherein said thermoplastic film is of uniform thickness and is contiguous with the walls of said groove.

7. A method as defined in claim 5 wherein the depth of said scored groove extends only partially through said fibre web and wherein said groove bottom wall is thus formed of fibre.

8. A method as defined in claim 5 wherein the depth of said scored groove extends completely through said fibre web and wherein said groove bottom wall is thus formed of said protective coating.

9. A method for protecting a raw edge of laminated fibre contained stock comprising the steps of:
   longitudinally feeding a fibre web having a protective coating of liquid impervious material adhered to its underside;
   scoring at least one groove longitudinally along said fibre web and to a predetermined depth, said groove being formed with a bottom wall and side walls;
   completely filling said groove with a thermoplastic material and adhering a film of said thermoplastic material to said fibre web on the side opposite said protective coating to form laminated container stock;
   longitudinally severing completely through said laminated container stock along the center of said groove bottom wall; and
   transversely severing said laminated container stock to form individual container body blanks.

10. A method as defined in claim 9 wherein the depth of said scored groove extends only partially through said fibre web and wherein said groove bottom wall is thus formed of fibre.

11. A method as defined in claim 9 wherein the depth of said scored groove extends completely through said fibre web and wherein said groove bottom wall is thus formed of said protective coating.

12. A method of fabricating a laminated fibre container having a protected and non-wicking top end seam, said method comprising the steps of:

longitudinally feeding a laminated web having an upper layer of fibre and a lower layer of thermoplastic;

longitudinally scoring at least one groove in said upper layer to a preselected depth, said groove having a flat bottom wall and tapered side walls;

adhering a thermoplastic material to said upper layer to completely cover said fibre and the walls of said groove, thus forming three-layer laminated fibre container stock;

longitudinally severing said laminated fibre container stock along the center of said groove bottom wall;

transversely severing said laminated fibre container stock to form individual container body blanks each having one protected edge formed by one half of said thermoplastically coated groove;

folding an individual container body blank into a tubular configuration with an open end being circumscribed by said protected edge; and folding said tubular container body into end seams with a pair of end closure members, thus forming a completed container having a protected edge at one end seam.

13. A method as defined in claim 12 wherein said thermoplastic material adhered to said upper layer is a uniform thin film which adheres contiguously to the walls of said groove.

14. A method as defined in claim 13 but further characterized by the steps, after longitudinal severing, of heating the side walls and bottom wall portions of said severed groove to render said thermoplastic film tacky, and hemming said bottom wall portions to their adjacent side walls by means of said tacky film.

15. A method as defined in claim 12 wherein said thermoplastic material adhered to said upper layer completely fills said groove to provide a completely planar upper surface on said laminated fibre container stock.

References Cited

UNITED STATES PATENTS

| | | | |
|---|---|---|---|
| 2,237,346 | 4/1941 | Gilfillan | 156—250 XR |
| 2,896,682 | 7/1959 | Elmendorf | 161—123 XR |
| 3,022,207 | 2/1962 | Lang | 156—257 XR |
| 3,058,868 | 10/1962 | Schroeder | 156—258 XR |
| 3,239,365 | 3/1966 | Petry | 117—11 |
| 3,256,131 | 6/1966 | Koch et al. | 161—119 |
| 3,328,189 | 6/1967 | Bauer | 117—4 |
| 2,137,238 | 11/1938 | Collins | 156—220 |
| 2,550,455 | 4/1951 | Davies | 161—44 |
| 2,575,257 | 11/1951 | Boulware | 156—220 XR |
| 2,653,888 | 9/1953 | Hyman | 161—149 XR |
| 3,252,385 | 5/1966 | Balocca | 93—36 |

EARL M. BERGERT, *Primary Examiner.*

H. F. EPSTEIN, *Assistant Examiner.*

U.S. Cl. X.R.

156—220, 224; 161—44, 149; 93—36, 58.2; 229—4.5